(12) United States Patent
Orosco et al.

(10) Patent No.: US 11,295,601 B2
(45) Date of Patent: Apr. 5, 2022

(54) SYSTEM FOR SUPERVISING SECURITY DEVICES

(71) Applicant: INEO HOMELAND, Paris (FR)

(72) Inventors: Thierry Orosco, Buc (FR); Jean-Marc Du Saillant Du Luc, Le Rouret (FR)

(73) Assignee: INEO HOMELAND, Paris (FR)

(*) Notice: Subject to any disclaimer, the term of this patent is extended or adjusted under 35 U.S.C. 154(b) by 0 days.

(21) Appl. No.: 16/606,427

(22) PCT Filed: Apr. 20, 2018

(86) PCT No.: PCT/FR2018/051000
§ 371 (c)(1),
(2) Date: Oct. 18, 2019

(87) PCT Pub. No.: WO2018/193219
PCT Pub. Date: Oct. 25, 2018

(65) Prior Publication Data
US 2020/0184802 A1 Jun. 11, 2020

(30) Foreign Application Priority Data
Apr. 20, 2017 (FR) ...................................... 1753456

(51) Int. Cl.
*G06F 3/0482* (2013.01)
*G08B 25/14* (2006.01)
(Continued)

(52) U.S. Cl.
CPC ........... *G08B 25/14* (2013.01); *G06F 3/0482* (2013.01); *G06F 3/0488* (2013.01); *G06F 3/04847* (2013.01)

(58) Field of Classification Search
CPC ...... A41D 1/002; G08B 25/14; G06F 3/0482; G06F 3/04847; G06F 3/0488
(Continued)

(56) References Cited

U.S. PATENT DOCUMENTS 5,223,816 A 6/1993 Levinson et al.
6,229,429 B1 5/2001 Horon
(Continued)

FOREIGN PATENT DOCUMENTS

GB 2325548 5/1997
WO WO-2017/052736 A1 3/2017

*Primary Examiner* — Beau D Spratt
(74) *Attorney, Agent, or Firm* — Harness, Dickey & Pierce PLC

(57) ABSTRACT

A system for supervising security devices associated with static attributes organized according to an ontology and circumferential dynamic attributes. A memory stores digital files for a plurality of events. Each event has a descriptor of each event. A descriptor for a triggering factor and descriptors of actions associated with each event are provided. The action of the plurality of description descriptors is a graphical representation file comprising graphical representations, at least one spatial temporal parameter or corresponding to a geographical scope of effectiveness of the action at the time since an initial element and a digital interaction with an associated one of the security devices. The computer commands automatic execution of actions and commands the display on the screen to display the graphical representation associated with each action based on the spatial temporal parameter and a digital interaction for guiding man-made machine interaction corresponding to the actions for non-automatic execution.

7 Claims, 1 Drawing Sheet

(51) Int. Cl.
*G06F 3/04847* (2022.01)
*G06F 3/0488* (2022.01)

(58) Field of Classification Search
USPC .......................................................... 715/734
See application file for complete search history.

(56) References Cited

U.S. PATENT DOCUMENTS

| | | |
|---|---|---|
| 6,281,790 B1 | 8/2001 | Kimmel et al. |
| 6,838,992 B2 | 1/2005 | Tenarvitz |
| 6,882,307 B1 | 4/2005 | Gifford |
| 6,917,288 B2 | 7/2005 | Kimmel et al. |
| 6,972,676 B1 | 12/2005 | Kimmel et al. |
| 7,429,921 B2 | 9/2008 | Seeley et al. |
| 7,986,228 B2 | 7/2011 | Friar et al. |
| 8,350,698 B2 | 1/2013 | Richman |
| 8,493,202 B1 | 7/2013 | Trundle et al. |
| 8,760,520 B2 | 6/2014 | Levin et al. |
| 10,002,635 B2 * | 6/2018 | Mack ..................... A41D 1/002 |
| 10,514,669 B1 * | 12/2019 | Call ....................... G06Q 50/16 |
| 2003/0062997 A1 | 4/2003 | Naidoo et al. |
| 2004/0150520 A1 | 8/2004 | Barrie |
| 2007/0008099 A1 | 1/2007 | Kimmel et al. |
| 2007/0279210 A1 | 12/2007 | Li et al. |
| 2008/0122609 A1 | 5/2008 | Mannisto et al. |
| 2009/0018875 A1 | 1/2009 | Monatesti et al. |
| 2009/0079575 A1 | 3/2009 | Bouressa |
| 2010/0238019 A1 | 9/2010 | Richman et al. |
| 2010/0245083 A1 | 9/2010 | Lewis |
| 2014/0139681 A1 | 5/2014 | Jones, Jr. et al. |
| 2015/0180902 A1 * | 6/2015 | Biswas ................ H04W 12/02 726/1 |

* cited by examiner

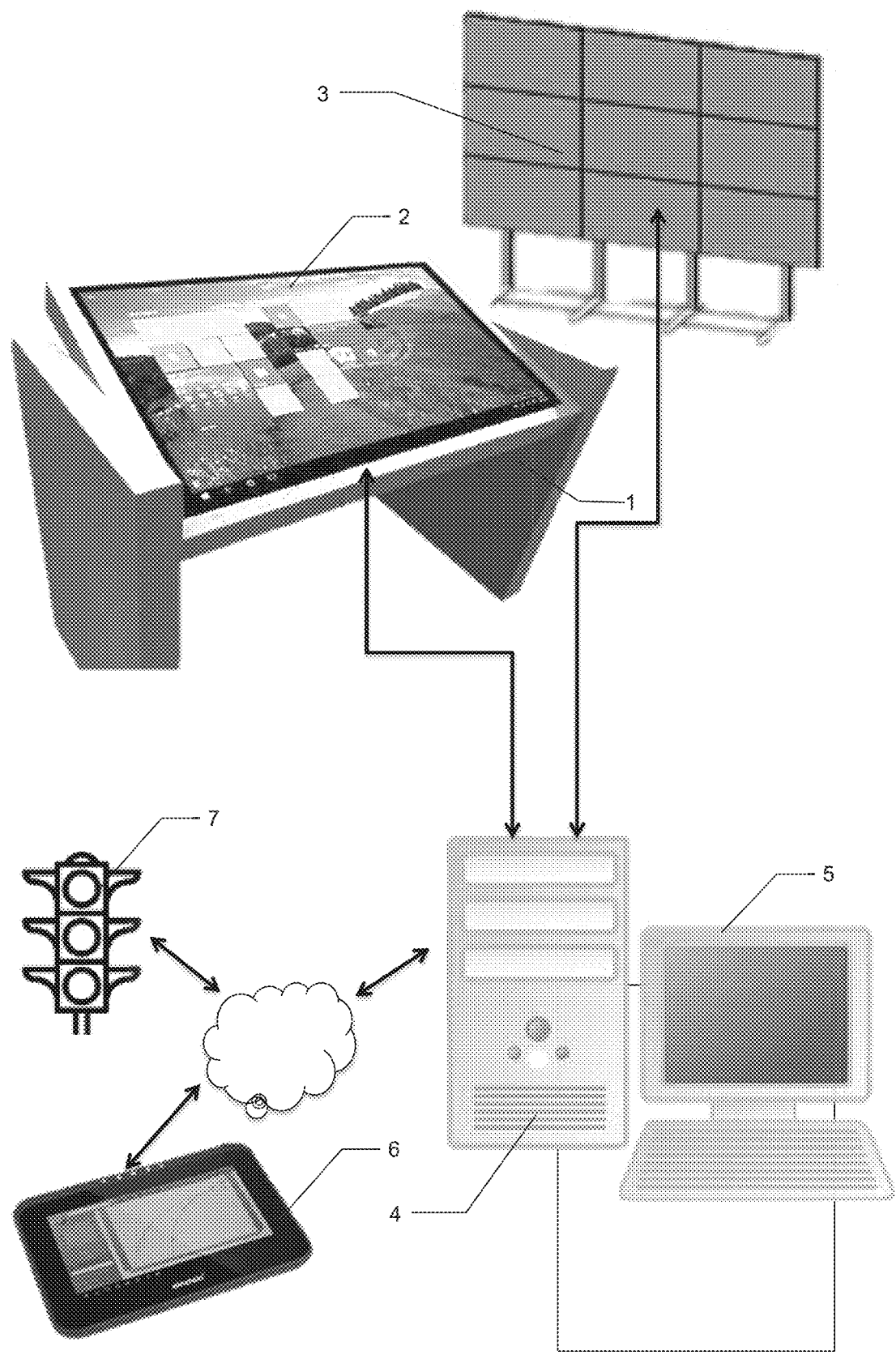

SYSTEM FOR SUPERVISING SECURITY DEVICES

CROSS-REFERENCE TO RELATED APPLICATIONS

This application is a National Phase entry of International Patent Application No. PCT/FR2018/051000, filed Apr. 20, 2018, which claims priority to French Patent Application No. 17/53456, filed Apr. 20, 2017, both of which are incorporated by reference herein.

TECHNICAL FIELD

This invention relates to the field of command systems for the security of public or private sites, populations or industrial installations, the prevention of risks of all kinds, and the organization of human and material resources to ensure the protection of persons, property and the environment against accidents, aggression, disasters and catastrophes. Command systems usually consist of an information system furnished with means of connection to external networks (satellites, analog and digital) and allow operators to access critical information (weather, telephone, e-mail, call, radio, video communication, Internet access, images from external sources, etc.). Live video transmission is also another option. Screens inside and outside the command centre provide real-time information to guide the actions of all stakeholders. This information covers the entire zone covered, with possible information on a partial zone.

BACKGROUND AND SUMMARY

The US patent application US20140139681 describing a method and system that allows a first responder security officer to take command and control of a vessel that has a security incident is known in the state-of-the-art. The purpose of this solution is to allow a security manager to be able to clearly distinguish the suspect and the positions of his/her teams for entering the building from the position of a suspect through a graphical representation of the friendly/enemy designation on which he/she can precisely direct a manoeuvre. A group of motion sensors is installed throughout the building to watch the various corridors.

Also known is the international application WO201705052736 for a risk assessment system that includes a probe to be introduced in the vicinity of a risk and the risk management processor circuits. The probe includes multiple sensors used to generate sensor data. Probe communication circuits are used to transmit a probe signal including sensor data externally to the probe. Probe processor circuits are used to coordinate the operation of multiple sensors and communications circuits.

The solutions proposed in the prior art have several drawbacks. First, the amount of information to be processed can be very large, making s-machine dialog interfaces confusing and difficult to operate without errors. This problem becomes particularly critical in crisis situations. Especially for large covered zones, the number of pieces of information presented to the operator is so large that it is difficult for the operator to have a global view and an overall understanding of the situation.

On the other hand, the sequence of visualized information requires a great deal of experience on the part of the operator for decision-making. In addition, particularly in emergency situations, it may be imperative to take multiple actions, simultaneously or at short intervals. State-of-the-art command posts are not well suited to handling a large number of simultaneous instructions. In particular, the US201439681 application relates to a method for the surveillance of people during a security incident, according to a predetermined scenario, taking into account the evolution of the position of a threat only, and in no way the adaptation of resources to a wide variety of scenarios, corresponding to threats of a very diverse nature and dynamics.

The purpose of this invention is to provide a system capable of grouping all functions in a single command post in order to avoid the above disadvantages. For this purpose, the invention, in its broadest sense, relates to a system for supervising security devices comprising a command post furnished with at least one screen for the display of cartographic information of the supervised zone as well as graphical representations associated with said security devices, and at least one computer controlling the display and the communication between the command post and said devices, characterized in that:
    each device is associated with static attributes organized according to an ontology and circumstantial dynamic attributes,
    and in that it includes a memory for the recording of digital files [Event] comprising:
    a descriptor of a reference event,
    at least one descriptor of the triggering factor,
    a plurality of descriptors of actions each associated with a graphical representation file,
    with at least one spatiotemporal parameter,
    and with a digital means of interaction with an associated device
    at least one indicator controlling the automatic execution or the activation by a man-machine interaction
    Said computer commanding, upon detection of a triggering factor, and as a function of contextualization data associated with each resource available in the field,
    on the one hand, the automatic execution of the actions associated with an automatic execution indicator, and
    on the other hand, the display on said screen of a graphical form associated with the event considered as well as graphical representations and means of man-machine interaction corresponding to the actions for non-automatic execution, Said computer controlling the communication between the command post and said devices as a function of the activations of an action displayed on said screen.

For the purposes of this patent, "safety devices" means any devices providing at least one piece of information that directly or indirectly contributes to the organization of one or more security strategies. Alternatively, the system includes at least one high-level command post and at least one low-level command post, each communicating with the high-level command post for event initiation by the high-level command post on the low-level command post. In another alternative solution, the system includes at least one high-level command post and at least one low-level command post, each communicating with the high-level command post for the transmission of information from actions activated on the low-level command post.

The invention also relates to a territorial supervision process comprising the display on a communication station of cartographic information of the supervised zone as well as graphical representations associated with said security devices, and at least one computer controlling the display and communication between the command post and said devices, characterized in that each device is associated with static attributes organized according to an ontology and circumstantial dynamic attributes, and a plurality of digital files are recorded [Event] including:

a descriptor of a reference event, at least one descriptor of the triggering factor, a plurality of associated action descriptors a graphical representation file, at least one spatiotemporal parameter, and a digital means of interaction with associated devices at least one indicator controlling the automatic execution or the activation by a man-machine interaction and in that, upon detection of a triggering factor, and as a function of contextualization data associated with each resource available in the field, on the one hand the automatic execution of the actions associated with an automatic execution indicator, and on the other hand the display on said screen of a graphical form associated with the event considered as well as graphical representations and means of man-machine interaction corresponding to the actions for non-automatic execution, as well as the communication between the command post and said devices as a function of the activations of an action displayed on said screen.

BRIEF DESCRIPTION OF THE DRAWING

The present invention will be better understood by reading the following description, made in reference to a non-limiting exemplary embodiment, in which:

FIG. 1 is a schematic view of the functional architecture of a system according to the invention.

DETAILED DESCRIPTION

The system includes a table 1 with a touch screen 2 associated with a screen wall 3. This system forms a command post allowing one or more operator(s) to receive information from surveillance devices, digital data sources and to centralize the supervision of a territorial zone. This devices is controlled by a computer 4 associated with a supervision and configuration station 5. This computer communicates bijectively with stationary or mobile supervision devices such as tablets 6 equipping operators in the field, as well as automatic devices such as traffic lights 7, electro-mechanical opening and closing systems, drones and more generally any connected devices intended to contribute to security missions.

Modelling of Supervised Devices

All the objects and events are modelled in the system through an ontological approach allowing contextualized management. This means that each resource available in the field includes one or more sensor(s), and indicators defining their ability to provide the service corresponding to an action. The proposed actions for each device take this indicator into account to calculate the relevance of whether or not to order the action on the device considered.

The structured or unstructured database includes for each device a set of attributes associated with each supervised device, organized in an ontological manner. Each resource is also associated with dynamic contextual data. The operator can select different modes of representation of the supervised zone, for example as a 3D map or satellite images, with a graphical representation of the different resources and supervised human or material means, equipped with geolocation means allowing the display to be synchronized in real time with the actual position in the field of each of these means.

For the movement of automatic devices such as drones, the touch screen 1 is a remote control device used to transfer the vehicle's progress control signals via the computer 4 to a vehicle located at a distance. The touch screen interface 1 is configured to display a graphical representation of the remote vehicle, allowing a user to manipulate the graphical representation on the touch screen. A converter module converts the manipulation of the graphical representation into vehicle control signals for transfer of these signals by the communication device.

In order to allow the operator in the command room to concentrate on actions requiring human arbitration, the invention consists in recording predefined events, as digital components to improve the reactivity and relevance of the actions decided with the supervision system. An event within the meaning of this patent is a set of data corresponding to a predefined situation, for which a series of recommended actions are established ("single online procedure"). A predefined situation is, for example, an armed robbery of a business, or an intrusion into a premises, or a demonstration on the urban road. Each event results in the recording of a descriptor and an icon or digital graphical representation, which will be displayed on the screen 1, in a geolocalized way.

The data set also includes one or more triggering factor descriptor(s). For example, for an intrusion into premises, the triggering factor may be the signal from an alarm centre in the room considered, or an alert by a verbal or digital message from a witness. These descriptors automate the activation of the event. The triggering factor may be a digital signal containing geolocation data or an identifier of the transmitter of the signal allowing the geolocation to be retrieved by querying a digital devices location table.

For each event, several recommended actions are recorded as digital data. These actions are grouped into:

automatic actions, which are triggered without human intervention as soon as the corresponding event is triggered recommended actions, which control the display of an interactive graphical representation allowing the operator to select or not the action, and possibly to set it, to send digital messages, for example instructions ordering a modification of the status or functions of material equipment or establishing a communication with a peripheral device of a human agent.

An action is necessarily associated with:

an operation of a predefined nature, such as changing the status of devices in the field, positioned in space with a time parameter, for example start and end, or duration.

The structure of an "event" data set is managed by systems such as "complex event processing engine" including scripts or calls to features recorded as an application on the computer 4. This structure can also be stored as a structured or unstructured database.

Automatic actions include, for example, activating surveillance cameras near the location of the event, and opening a video stream to the command post, or triggering an audible alarm at the location corresponding to the event, or opening or closing airlocks or access doors, or changing the status of traffic lights. The recommended actions are optionally associated with a relevance indicator that guides the operator in decision-making. This includes, for example, contacting human means in the vicinity of the event, or sending a digital message containing a trajectory to be followed by a human vehicle or a drone.

The actions can be associated with a spatiotemporal graphical representation calculated dynamically as a function of the geographical scope of effectiveness of the action considered, as a function of the time elapsed since an initial element, for example the triggering of the event. This graphical representation guides the operator in selecting an action. Upon triggering of an event, the computer records the activations of the actions in a time-stamped manner, to create a history file corresponding to the sequence of actions decided automatically or manually, and the effects obtained. These history files are then used to recalculate the "event" files, for example using "machine learning" techniques, to improve the relevance of the recommended actions or to calculate new scenarios to build new "events".

Circumstantial Calculation of an Event

The solution can also include predictive means to determine new events based on a combination of information from field devices. For example, several devices may provide a low-level warning signal, but the combination results in the calculation of an early warning indicator. For example, for an industrial installation, the fire early warning signal is calculated from weak signals from temperature sensors of a device.

Multi-Level System

According to one alternative solution, the system includes several command posts and several computers, corresponding to hierarchized territorial levels, for example a national level and a regional level. In this case, the high level can command an action or event to be triggered at the low level, or create new events at the low level. For example, it is an "attack alert" type event whose associated actions are the activation of surveillance points, or the activation of localization means, or the control of the closure of certain premises. Similarly, the low level can transmit the results of certain actions, such as video streams from cameras, to the high level.

Planning

The solution can also include planning means, i.e., determining the necessary means and strategy to be deployed to manage foreseeable future events based on a combination of information from field devices, history and established schemes.

The invention claimed is:

1. A system for supervising security devices comprising:
   (a) a command post furnished with at least one screen for display of cartographic information of a supervised zone as well as graphical representations associated with said security devices;
   (b) at least one computer controlling said display and communication between said command post and said security devices;
   (c) each of said security devices is associated with static attributes organized according to an ontology corresponding to an ability to provide service based on an action and circumstantial dynamic attributes;
   (d) a memory for storing digital files for a plurality of events, each event of the plurality of events comprising:
      (i) a descriptor of each event;
      (ii) at least one descriptor of a triggering factor associated with each event;
      (iii) a plurality of descriptors of actions associated with each event, each action of the plurality of descriptors associated with:
         a graphical representation file comprising the graphical representations;
         at least one spatiotemporal parameter corresponding to a geographical scope of effectiveness of the action and a time since an initial element; and
         a digital interaction with an associated one of the security devices;
      (iv) at least one indicator controlling automatic execution or activation by a man-machine interaction;
   said computer commanding, upon detection of said triggering factor, and as a function of contextualization data of the ontology associated with each security device available:
      automatic execution of the actions associated with an automatic execution indicator; and
      said display on said screen to display the graphical representation associated with an action based on the spatiotemporal parameter and a digital interaction for guiding man-machine interaction corresponding to said actions for non-automatic execution; and
   (e) said computer controlling said communication between said command post and said security devices as a function of said activations of an action displayed on said screen.

2. The system for supervising security devices according to claim 1, further comprising at least one high-level command post and at least one low-level command post each low-level command post communicating with the at least one high-level command post for event initiation by the at least one high-level command post on the at least one low-level command post.

3. The system for supervising security devices according to claim 1, further comprising at least one high-level command post and at least one low-level command post, each low-level command post communicating with the at least one high-level command post for said transmission of information from said actions activated on the at least one low-level command post.

4. A method of territorial supervision comprising:
   (a) displaying on a communication station of cartographic information of a supervised zone as well as graphical representations associated with security devices;
   (b) controlling display and communication between a command post and said devices by at least one computer;
   (c) associating each of said devices with static attributes organized according to an ontology corresponding to an ability to provide service based on an action and circumstantial dynamic attributes;
   (d) storing digital files for a plurality of events, each event of the plurality of events including:
      (i) a descriptor of each event;
      (ii) at least one descriptor of a triggering factor associated with each event;
      (iii) a plurality of descriptors of actions associated with each event, each action of the plurality of descriptors associated with:
         a graphical representation file comprising the graphical representations;
         at least one spatiotemporal parameter corresponding to a geographical scope of effectiveness of the action and a time since an initial element; and
         a digital interaction with an associated one of the security devices;
      (iv) at least one indicator controlling the automatic execution or the activation by a man-machine interaction;

(v) upon detection of said triggering factor, and as a function of contextualization data of the ontology associated with each security device available, automatic execution of said actions associated with an automatic execution indicator, and the display on said screen to display the graphical representation associated with an action based on the spatiotemporal parameter and a digital interaction for guiding man-machine interaction corresponding to said actions for non-automatic execution, and said communication between said command post and said devices as a function of said activations of an action displayed on said screen.

5. The system of claim 1 further comprising a relevance indicator associated with the recommended actions.

6. The system of claim 1 further comprising storing a history file based on the automatic execution and manual execution of actions.

7. The system of claim 6 further comprising, based on the history file, recalculating the digital files for at least one event of the plurality of events.

\* \* \* \* \*